United States Patent [19]
Ruiz et al.

[11] Patent Number: 5,834,853
[45] Date of Patent: *Nov. 10, 1998

[54] SEA/RIVER POWERED POWER PLANT

[75] Inventors: Rene A. Ruiz, Houston, Tex.; George Spector, New York, N.Y.

[73] Assignee: The Ruiz Law Firm, Houston, Tex.

[*] Notice: The terminal 22 months of this patent has been disclaimed.

[21] Appl. No.: 280,129

[22] Filed: Jul. 25, 1994

[51] Int. Cl.$^6$ ............................ F03B 13/00; H02P 9/04
[52] U.S. Cl. ........................ 290/54; 290/42; 290/43; 290/52; 290/53; 415/36
[58] Field of Search ................... 290/42, 43, 52, 290/54, 53, 56; 415/36

[56] References Cited

U.S. PATENT DOCUMENTS

| | | | |
|---|---|---|---|
| 241,800 | 5/1881 | Grant | 415/36 |
| 953,487 | 3/1910 | Nikonow | 290/52 |
| 1,289,533 | 12/1918 | Pelton | 290/53 |
| 4,717,831 | 1/1988 | Kikuchi | 290/53 |
| 4,965,998 | 10/1990 | Estigoy et al. | 290/43 |

*Primary Examiner*—Steven L. Stephan
*Assistant Examiner*—Elvin G. Enad

[57] ABSTRACT

A sea/river powered power plant that harnesses the movement of sea waves and river currents to convert them into useful electrical energy. The power plant contains turbines which rotate about a horizontal axis as the waves and currents strike a lower portion thereof, so to turn a shaft, which eventually operates a driven shaft of an electric generator.

3 Claims, 4 Drawing Sheets

SEA/RIVER POWERED POWER PLANT

BACKGROUND OF THE INVENTION

The instant invention relates generally to electric power plants and more specifically it relates to a sea/river powered power plant which provides a mechanism that will harness the natural movement of sea waves and river currents to convert them into useful energy.

It is well known that in these days considerable attention is being given to energy conservation and prevention of pollution of the environment. It is also well known that working energy produced by engines powered by fossil fuels or coal uses up irreplaceable fuels and also pollutes the environment, so it is no longer ideal and mankind accordingly must look to naturally produced energy for a solution.

There are available various conventional electric power plants which do not provide the novel improvements of the invention herein disclosed.

SUMMARY OF THE INVENTION

A primary object of the present invention is to provide a sea/river powered power plant that will overcome the shortcomings of the prior art devices.

Another object is to provide a sea/river powered power plant that will harness the natural movement of sea waves and river currents to convert them into useful energy.

An additional object is to provide a sea/river powered power plant that can be built on a large scale, so as to furnish the needed energy for an entire city or other community and produce such energy at a very low cost to consumers, because the energy source is free.

A further object is to provide a sea/river powered power plant that is simple and easy to use.

A still further object is to provide a sea/river powered power plant that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a diagrammatic side view of a first embodiment of the instant invention to be used at the sea shore.

FIG. 2 is a perspective view of a second embodiment without the blade ratchet and winding coupler used over a river.

FIG. 3 is a top view of the second embodiment taken in direction of arrow 3 in FIG. 2.

FIG. 4 is a cross sectional view taken along line 4—4 in FIG. 1, showing one of the turbine units in greater detail.

FIG. 5 is a perspective view partly in cross section of the gear reduction housing of the winding coupler in FIG. 1.

FIG. 6 is a perspective view of the gear reduction of the winding coupler.

FIG. 7 is a perspective view partly in cross section of the winding coupler.

FIG. 8 is a top view partly in cross section of the winding coupler and its interior gear.

FIG. 9 is a diagrammatic side view of a third embodiment showing two opposite assemblies thereof to utilize the movement of the waves in two directions.

FIG. 10 is a diagrammatic side view of a fourth embodiment similar to FIG. 1 with the blade ratchet and the winding coupler used in a river.

FIG. 11 is a cross sectional view taken along line 11—11 in FIG. 10 showing the balanced flywheel with its balancing weights in greater detail.

FIG. 12 is an enlarged cross sectional view taken along line 12—12 in FIG. 10 showing the internal mechanism of the automatic speed governor coupler in greater detail.

FIG. 13 is an enlarged detailed view as indicated by arrow 13 in FIG. 12.

FIG. 14 is an enlarged detailed view as indicated by arrow 14 in FIG. 12.

DETAILED DESCRIPTION OF THE PREFERRED EMBODIMENTS

Turning now descriptively to the drawings, in which similar reference characters denote similar elements throughout the several views, the FIG. 1 illustrates a sea powered power plant 20 which consists of a framework 22 installed offshore upon a bottom 24 of the sea 26. A plurality of pillars 28 are spaced apart and extend upright from the framework 22 out of the sea 26.

A first horizontal shaft 30 is rotatively mounted on the upper ends of the pillars 28. A plurality of ratchet type turbines 32 are connected to the first shaft 30, so that the turbines 32 can be rotated in one direction by sea waves 34. A winding coupler 36 is connected to one end of the first shaft 30. A second horizontal shaft 38 is rotatively mounted on the upper ends of the pillars 28 and is connected at a first end to the winding coupler 36, so that the winding coupler 36 can transmit a constant rotational input from the first shaft 30 to the second shaft 38. An augment gear assembly 40 is connected to a second end of the second shaft 38, while a third horizontal shaft 42 is rotatively mounted on the upper ends of the pillars 28 and is connected at a first end to the augment gear assembly 40, so that the augment gear assembly 40 can increase the rotational speed from the second shaft 38 to the third shaft 42. A fourth horizontal shaft 44 is rotatively mounted on the upper ends of the pillars 28 and is connected at a first end to a second end of the third shaft 42. A dynamic balance flywheel 46 with a plurality of radially disposed counterweights 48 thereon is connected to the fourth shaft 44 to produce an evenly smooth rotation of the fourth shaft 44. A fifth horizontal shaft 50 is rotatively mounted on the upper ends of the pillars 28 and is connected at a first end to a second end of the fourth shaft 44.

An automatic governing speed coupler 52 is connected to the fifth shaft 50. An electric generator 54 has a driven shaft 56 which will engage with the fifth shaft 50 when the automatic governing speed coupler 52 reaches its predetermined revolutions per minute, so that the generator 54 will produce electrical energy for a practical consumption.

As seen in FIGS. 12 and 13, speed governor 52 includes weight 51 attached by pivoting links 53 to a collar 55 mounted on a hollow shaft 50. A piston 57 is slideably mounted in shaft 50 which reciprocates axially in shaft 50 responsive to the influence of the centrifugal force of weights 51 moving outwardly away from piston 57 as the rotational speed of shaft 50 increases. Axial movement of piston 57 permits outward and inner movement of the weights 51 thus varying the rotational resistance and rotational speed of the shaft 50. Accordingly a surge of rotational torque generated by the turbines 32 increases shaft rotational speed, causing the weights 51 to move outward increasing rotational resistance thus governing shaft rotational speed to uniform acceptable increments.

Figure 13:
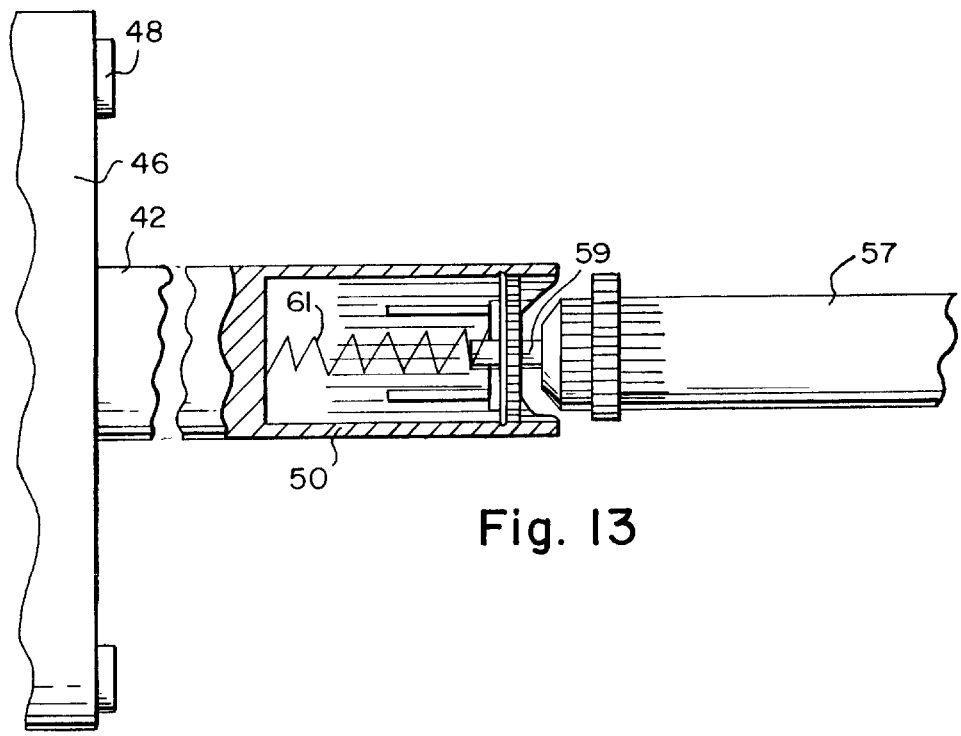
Figure 14:
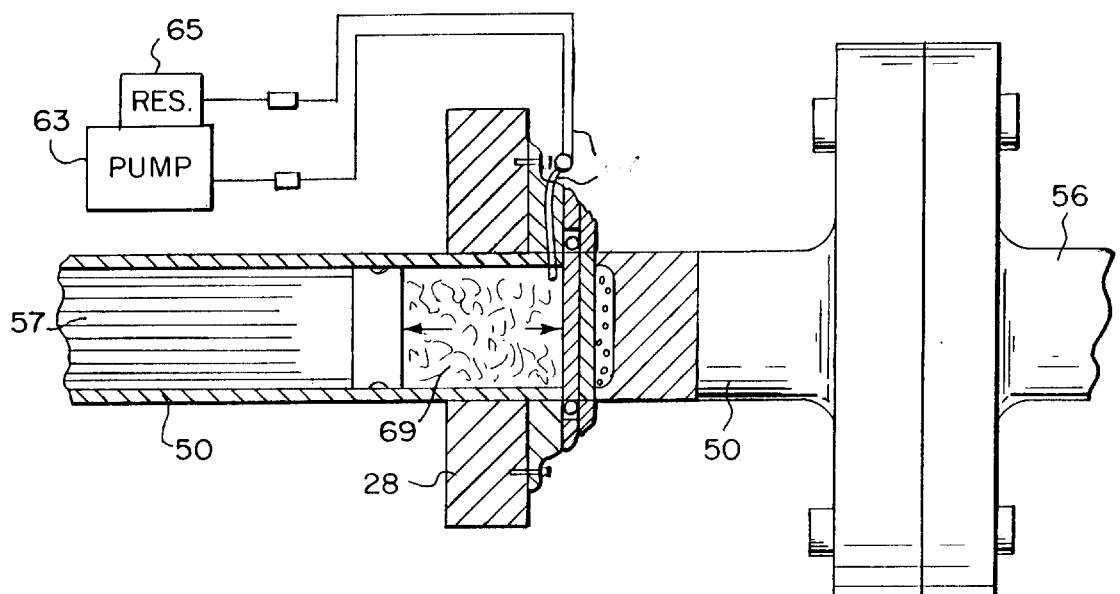

In FIG. 13, piston 57 has a rod 59 which engages a spring 61 mounted in shaft 50 for resisting axial displacement of piston 57. In addition, axial displacement of piston 57 is resisted by fluid pressure provided by pump 63, in reservoir 65 via conduit 67 communicating with chamber 69 as seen in FIG. 14.

Figure 4:
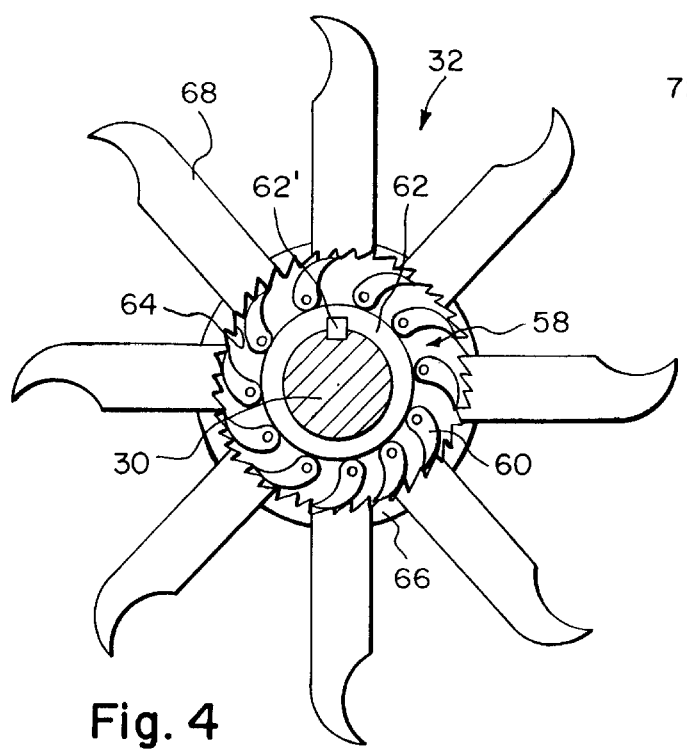
Figure 5:
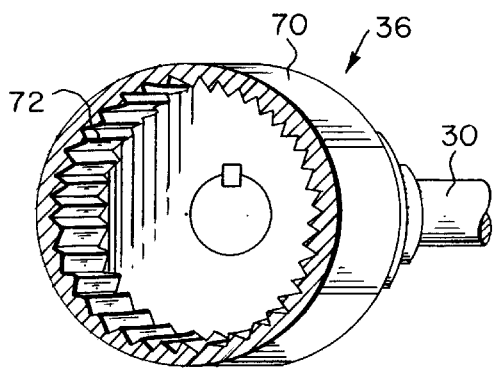
Figure 6:
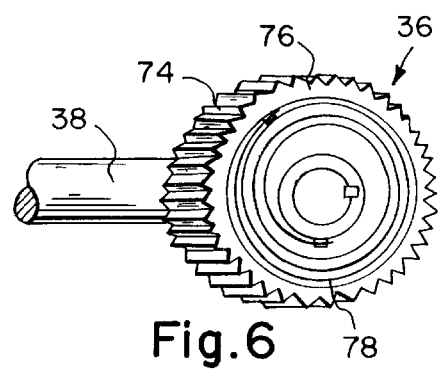
Figure 7:
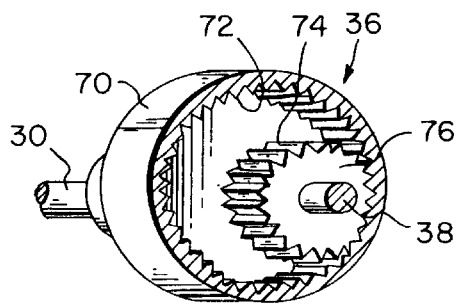
Figure 8:
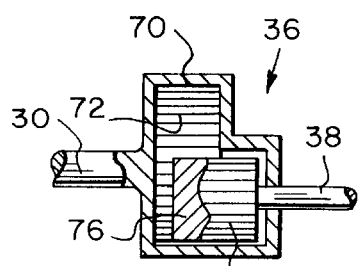
Figure 9:
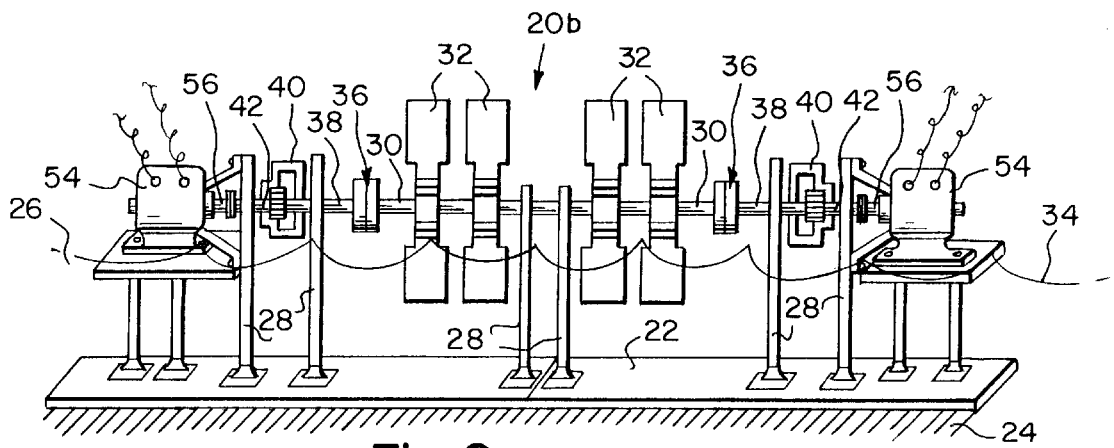
Figure 10:
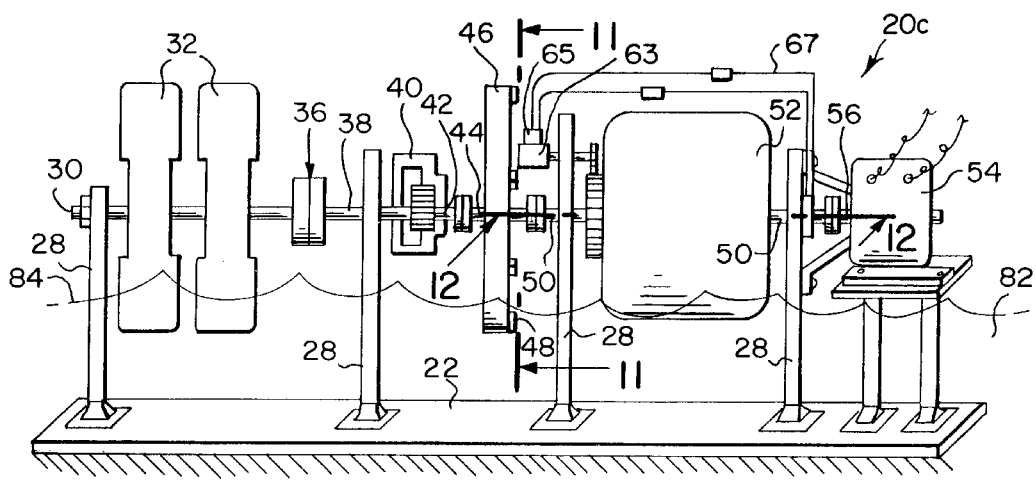
Figure 11:
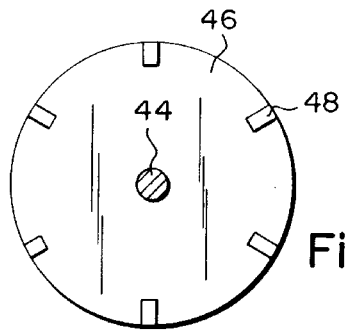
Figure 12:
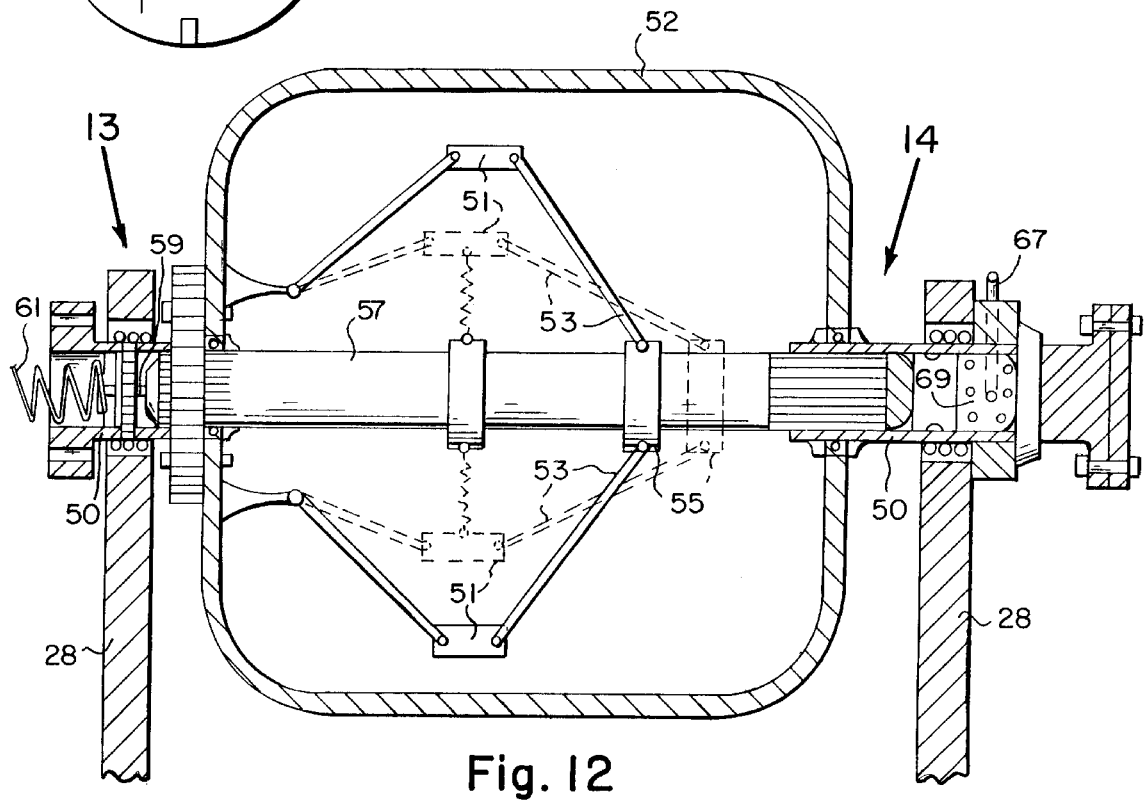

As shown in FIG. 4, the ratchet type turbine 32 contains a reversing clutch 58 which includes spaced teeth 60 pivotally mounted about the first shaft 30 via a collar 62 with a key 62' and co-acting with ratchet teeth 64 secured to a drum 66, to which turbine arms 68 are attached, whereby the first shaft 30 rotates only in one direction due to the turbine arm 68 rotation. If the turbine arms 68 are pushed by the sea water possibly in a reverse direction when the wave water is backwashed, the clutch 58 slips. While the arms 68 may reverse travel direction, the first shaft 30 is not reversed in rotational direction. Thus, if several ratchet type turbines 32 are located along the first shaft 30, the shaft continues to be rotated in a same one direction even if some of the turbines 32 are caused by backwash to reverse rotational direction.

The winding coupler 36 contains co-acting gears with a spring 78 attached between one of the gears and the second shaft 38, to compensate for temporary torque fluctuations. As shown in FIGS. 5 through 8, the winding coupler 36 contains a housing 70 having teeth 72 on its inner side to be engaged by teeth 74 of an internal gear 76 there within. The internal gear 76 is mounted on the second shaft 38, while the housing is mounted on the first shaft 30, which is horizontally offset from shaft 38.

A winding spring 78 has one end affixed to the second shaft 38 and its other end affixed to the internal gear 76 to store rotational energy in the spring 78, to compensate for possible momentary torque fluctuations.

Figure 1:
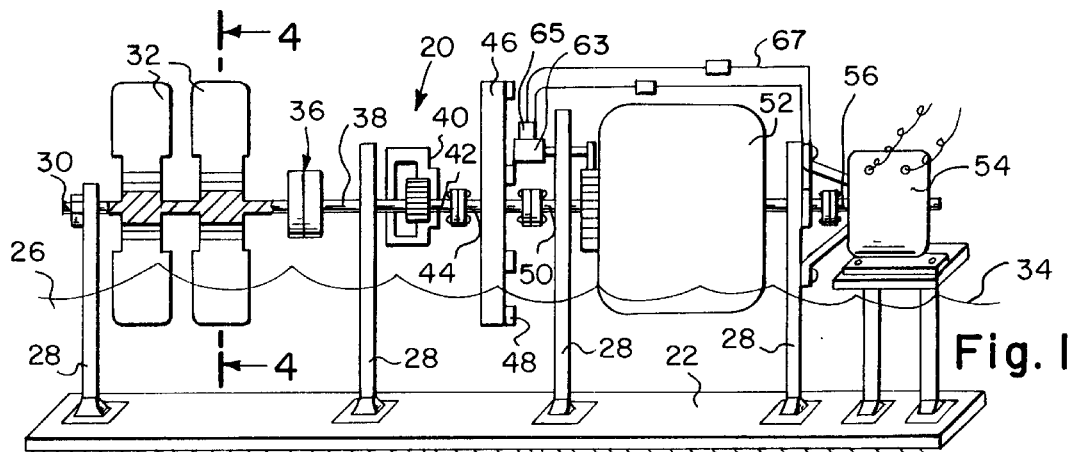
Figure 2:
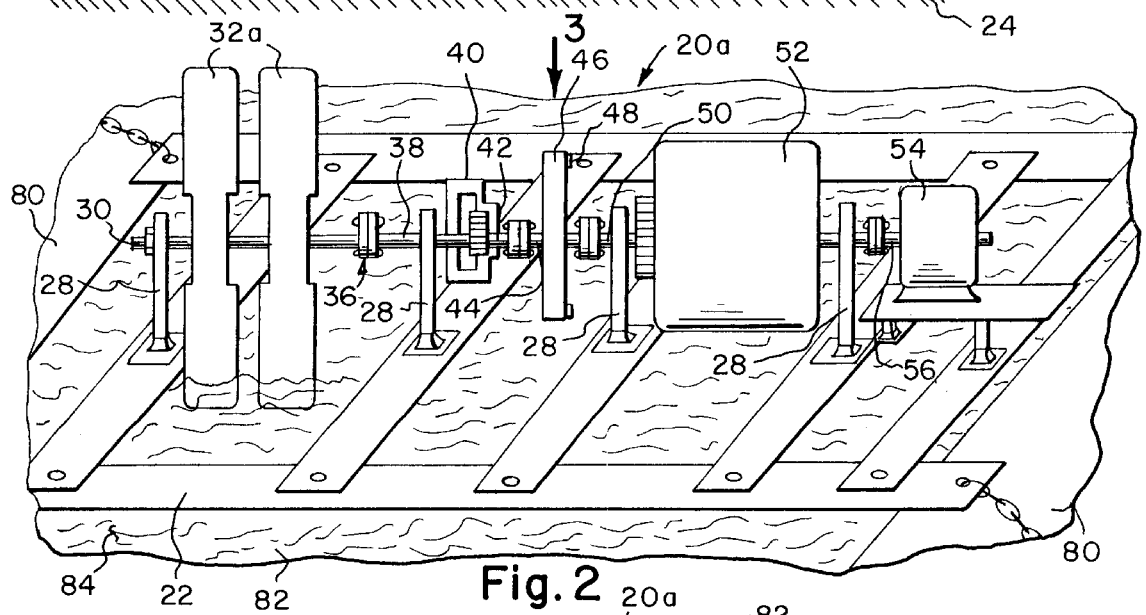
Figure 3:
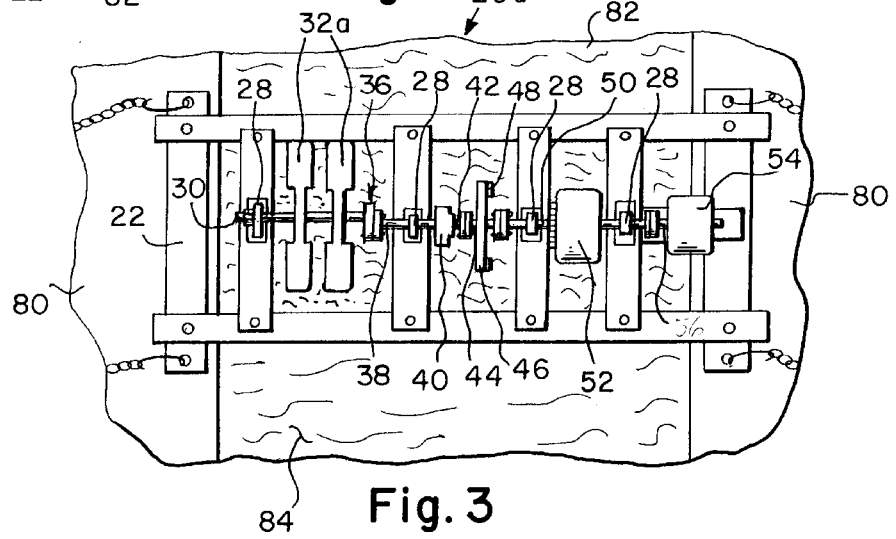

FIGS. 2 and 3 show a river powered power plant 20*a* which consists of a framework 22 installed upon river banks 80 to extend over a river 82. A plurality of pillars 28 are spaced apart and extend upright from the framework 22 above the river 82.

A first horizontal shaft 30 is rotatively mounted on the upper ends of the pillars 28. A plurality of turbines 32*a* are connected to the first shaft 30, so that the turbines 32*a* can be rotated by river currents 84. A second horizontal shaft 38 horizontally offset from shaft 30 is rotatively mounted on the upper ends of the pillars 28 and is connected at a first end to the first shaft 30. An augment gear assembly 40 is connected to a second end of the second shaft 38. A third horizontal shaft 42 is rotatively mounted on the upper ends of the pillars 28 and is connected at a first end to the augment gear assembly 40, so that the augment gear assembly 40 can increase the rotational speed from the second shaft 38 to the third shaft 42. A fourth horizontal shaft 44 is rotatively mounted on the upper ends of the pillars 28 and is connected at a first end to a second end of the third shaft 42. A dynamic balance flywheel 46 with a plurality of radially disposed counterweights 48 thereon is connected to the fourth shaft 44 to produce an evenly smooth rotation of the fourth shaft 44. A fifth horizontal shaft 50 is rotatively mounted on the upper ends of the pillars 28 and is connected at a first end to a second end of the fourth shaft 44. Because shaft 38 is offset from shaft 30 only in a horizontal direction, the offset is not seen in FIGS. 1, 2, 9 and 10.

An automatic governing speed coupler is connected to the fifth shaft 50. An electric generator 54 has a driven shaft 56 which will engage with the fifth shaft 50, when the automatic governing speed coupler 52 reaches it predetermined revolutions per minute, so that the generator 54 will produce electrical energy for a practical consumption.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A sea powered power plant which comprises:

a) a framework installed offshore upon a bottom of the sea;

b) a plurality of pillars spaced apart and extending upright from said framework out of the sea;

c) a first horizontal shaft rotatively mounted on the upper ends of said pillars;

d) a plurality of ratchet type turbines connected to said first shaft, so that said turbines can be rotated in one direction by sea waves;

e) a winding coupler connected to one end of said first shaft;

f) a second horizontal shaft rotatively mounted on the upper ends of said pillars and connected at a first end to said winding coupler, so that said winding coupler can transmit a constant rotational speed from said first shaft to said second shaft;

g) an augment gear assembly connected to a second end of said second shaft for increasing rotational speed;

h) a third horizontal shaft rotatively mounted on the upper ends of said pillars and connected at a first end to said augment gear assembly, so that augment gear assembly can increase the rotational speed from said second shaft to said third shaft;

i) a fourth horizontal shaft rotatively mounted on the upper ends of said pillars and connected at a first end to a second end of said third shaft;

j) a dynamic balance flywheel with a plurality of radially disposed counterweights thereon connected to said fourth shaft to produce an evenly smooth rotation of said fourth shaft;

k) a fifth horizontal shaft having hollow portions rotatively mounted onto upper ends of said pillars and connected at a first end to a second end of said fourth shaft;

l) an automatic speed governor connected to said fifth shaft, wherein said fifth shaft is rotatively mounted in said governor and said governor comprises means for varying output rotational shaft speed responsive to changes in input shaft speed and m) an electric generator having a driven shaft engaged with said fifth shaft, so that said generator will produce electrical energy for a practical consumption, wherein said governor further comprises a housing enclosing an axial sliding piston mounted in said fifth shaft, including weights mounted pivotally on said piston and said housing, in further combination with an axially mounted spring at one end of said piston resisting axial movement of said piston.

2. A sea powered power plant as recited in claim 1, wherein each said ratchet type turbine contains a reversing clutch which includes spaced teeth pivotally mounted about said first shaft via a collar and coacting with ratchet teeth secured to a drum to which turbine arms are attached, whereby said first shaft rotates only in one direction due to said turbine arm rotation.

3. A sea powered power plant as recited in claim 1, wherein each said winding coupler includes coacting gears with a spring attached between one of said gears and said second shaft.

* * * * *